United States Patent
Legl

(10) Patent No.: US 11,148,528 B2
(45) Date of Patent: Oct. 19, 2021

(54) TRANSFER GEARBOX DEVICE

(71) Applicant: Magna Powertrain GmbH & Co KG, Lannach (AT)

(72) Inventor: Lukas Legl, Graz (AT)

(73) Assignee: MAGNA POWERTRAIN GMBH & CO KG, Lannach (AT)

(*) Notice: Subject to any disclaimer, the term of this patent is extended or adjusted under 35 U.S.C. 154(b) by 88 days.

(21) Appl. No.: 16/613,770

(22) PCT Filed: Apr. 18, 2018

(86) PCT No.: PCT/EP2018/059869
§ 371 (c)(1),
(2) Date: Nov. 14, 2019

(87) PCT Pub. No.: WO2018/210516
PCT Pub. Date: Nov. 22, 2018

(65) Prior Publication Data
US 2020/0079212 A1 Mar. 12, 2020

(30) Foreign Application Priority Data
May 18, 2017 (DE) .......................... 102017208433.2

(51) Int. Cl.
*F16H 57/04* (2010.01)
*F16D 13/72* (2006.01)
(Continued)

(52) U.S. Cl.
CPC ....... *B60K 17/346* (2013.01); *F16H 57/0483* (2013.01); *F16D 13/72* (2013.01);
(Continued)

(58) Field of Classification Search
CPC .......................... F16H 57/045–57/0454; F16H 57/0421–57/0426
See application file for complete search history.

(56) References Cited

U.S. PATENT DOCUMENTS 5,148,903 A * 9/1992 Kobayashi ............ B60K 17/35
192/106 F
2014/0231209 A1* 8/2014 Nett .................... F16H 57/0483
192/85.01
(Continued)

FOREIGN PATENT DOCUMENTS

DE 102010036826 A1 2/2012
DE 102012219182 A1 5/2014
(Continued)

OTHER PUBLICATIONS

Bock, raw translation of "Transfer case device e.g. front axle transfer case device, for vehicle drive train, has oil conveying device provided in oil chamber of shifting element, where oil is guided from chamber to oil chamber of gear device by conveying device", 2014, 38 pages (Year: 2014).*
(Continued)

*Primary Examiner* — David R Morris
*Assistant Examiner* — Lillian T Nguyen
(74) *Attorney, Agent, or Firm* — Dickinson Wright PLLC

(57) ABSTRACT

A transfer gearbox device, comprising a differential gear with a crown wheel in a first oil chamber, and a friction clutch in a second oil chamber. The first oil chamber comprises a first oil sump and the second oil chamber comprises a second oil sump. A valve is between the first oil chamber and the second oil chamber. When the valve is open, oil can pass via the valve out of the first oil chamber into the second oil chamber. When the valve is closed, oil cannot pass via the valve out of the first oil chamber. When the valve is open, by rotating the crown wheel, oil is conveyed by the crown wheel from the first oil sump into a first oil collector and is guided therefrom via a first oil guide and via the valve to the friction clutch cool and/or to lubricate the friction clutch.

17 Claims, 3 Drawing Sheets

(51) Int. Cl.
B60K 17/346 (2006.01)
F16D 13/74 (2006.01)
(52) U.S. Cl.
CPC ............ *F16D 13/74* (2013.01); *F16H 57/045* (2013.01); *F16H 57/0423* (2013.01); *F16H 57/0457* (2013.01); *F16H 57/0473* (2013.01)

(56) References Cited

U.S. PATENT DOCUMENTS

| | | |
|---|---|---|
| 2014/0231211 A1 | 8/2014 | Nett et al. |
| 2014/0335990 A1* | 11/2014 | Martucci ............... F16H 57/031 475/160 |
| 2017/0122427 A1* | 5/2017 | Valente ................ F16H 57/045 |

FOREIGN PATENT DOCUMENTS

| | | |
|---|---|---|
| JP | 2014132178 A | 7/2014 |
| WO | 2013045444 A1 | 4/2013 |

OTHER PUBLICATIONS

International Search Report regarding Application No. PCT/EP2018/059869 dated Jul. 6, 2018.

* cited by examiner

TRANSFER GEARBOX DEVICE

CROSS-REFERENCE TO RELATED APPLICATIONS

This U.S. National Stage Patent Application claims the benefit of and priority to PCT International Patent Application Serial No. PCT/EP2018/059869, filed Apr. 18, 2018, which claims the benefit of and priority to DE102017208433.2, filed May 18, 2017. The entire disclosures of each of the above applications are incorporated herein by reference.

FIELD OF THE INVENTION

The present invention relates to a transfer gearbox device for a motor vehicle, comprising a differential gear and a friction clutch.

BACKGROUND OF THE INVENTION

This section provides information related to the present disclosure which is not necessarily prior art.

Transfer gearbox devices for motor vehicles, by means of which an input torque can be distributed between usually two output shafts, are known per se. They can comprise a differential gear for infinitely variable distribution of the input torque between two output shafts and a friction clutch for coupling and decoupling one of the output shafts from the drive train. A transfer gearbox device of this kind can also be used for selective distribution of a torque to a second drive axle of the motor vehicle.

All-wheel drive systems can have a friction clutch of this kind with a multiplicity of friction disks or plates, around which a fluid flows in order to provide lubrication and cooling of the plates when the clutch is engaged (closed, connect state). Such a fluid is usually formed by an oil and is referred to below as "oil", although it is intended that any suitable fluid for lubrication and/or cooling should be included.

When the clutch is disengaged (opened, disconnect state), the disks or plates are separated. When they are separated, excess fluid between the disks and within the clutch cage through which the disks rotate can increase the drag torque. It is advantageous to reduce this drag torque. However, sufficient oil must be available during the engagement of the clutch to avoid excessive temperatures of the disks.

If the plates of a friction clutch of a transfer gearbox device are situated in an oil sump, even in a disconnect state, i.e. when the clutch is open, this therefore causes high efficiency losses.

SUMMARY OF THE INVENTION

This section provides a general summary of the disclosure, and is not a comprehensive disclosure of its full scope or all of its features.

It is an object of the invention to improve a transfer gearbox device in this respect and, in particular, to specify a transfer gearbox device which is optimized for efficiency and has lower drag losses.

The object is achieved by a transfer gearbox device for a motor vehicle, comprising a differential gear with at least one crown wheel in a first oil chamber, and a friction clutch in a second oil chamber, wherein the first oil chamber comprises a first oil sump and the second oil chamber comprises a second oil sump, wherein a valve is arranged between the first oil chamber and the second oil chamber, and therefore, when the valve is open, oil can pass via the valve out of the first oil chamber into the second oil chamber and, when the valve is closed, oil cannot pass via the valve out of the first oil chamber into the second oil chamber, wherein the valve and the crown wheel are arranged in such a manner that, when the valve is open, upon rotation of the crown wheel oil is conveyed by means of the crown wheel out of the first oil sump into a first oil collector and is guided from the first oil collector via a first oil guide and via the valve to the friction clutch in order to cool and/or to lubricate the friction clutch.

According to the invention, the rotation of a crown wheel which, in particular, forms an input element of the differential gear of the transfer gearbox device, said rotation being present in any case during operation, is used to ensure state-dependent oil circulation between the first oil chamber (drive assembly, differential) and the second oil chamber (clutch).

For this purpose the pumping action of the crown wheel is used to supply the oil to the friction clutch, and the pumping action of the clutch cage is preferably also used to return the oil.

The oil circulation is made possible by an oil guide, which can be implemented by means of various oil guiding devices, preferably made of plastic, and/or by means of housing parts. In order to allow an oil supply to the clutch in a manner appropriate to requirements, a valve, preferably actuated by the clutch actuator, is also employed.

In this case, the valve and the crown wheel are arranged in such a manner that, during operation, i.e. when the crown wheel is rotating, oil is conveyed by means of the crown wheel out of the first oil sump into a first oil collector when the valve is open, said collector preferably being situated above the oil sump and/or above the crown wheel in the installed position. In particular, the first oil collector can be a collecting tank. A collecting tank of this kind can have a volume sufficient to act as a temporary store for the oil. From the first oil collector, the oil is guided via a first oil guide and via the valve to the friction clutch in order to cool and/or to lubricate the friction clutch.

This arrangement allows both efficient and economical lubrication and/or cooling when the valve is open and stopping of the oil supply when the valve is closed. Here, the valve is preferably open when the friction clutch is closed and closed when the friction clutch is open—in particular automatically by means of a common actuating system.

It is preferable if a second oil collector and a second oil guide of the transfer gearbox device are arranged in such a manner that, upon rotation of a component of the friction clutch, in particular a clutch cage of the friction clutch and/or plates of the friction clutch, oil is conveyed by means of the component of the friction clutch out of the friction clutch into the second oil collector and is guided from the second oil collector via the second oil guide into the first oil sump. The pumping action of the clutch cage is thus used to return the oil.

Here, the first oil guide is preferably designed in such a manner that the oil is supplied radially on the inside to the friction clutch. The oil can then be flung outward on the friction clutch.

The first oil guide preferably comprises an oil finger, wherein the oil finger is arranged coaxially on a first output shaft of the differential gear, particularly preferably directly on the output shaft and, in particular, in such a manner that the oil finger rotates with the first output shaft.

The first oil guide preferably comprises an oil downpipe, wherein oil is guided out of the first oil collector via the oil downpipe by means of gravity to the oil finger.

The valve is preferably arranged between the oil downpipe and the oil finger.

The second oil collector is preferably designed as an oil catching device. The oil catching device preferably essentially forms a radially inwardly open cylinder jacket situated radially on the outside in the second oil chamber, close to a housing of the transfer gearbox device.

The second oil guide is preferably arranged substantially radially outside the first oil guide. The first output shaft preferably forms the center around which the first and then the second oil guide are arranged in a radially spaced manner.

The first oil chamber and the second oil chamber are preferably connected fluidically or can be connected fluidically exclusively via the first oil guide and the second oil guide. The second oil guide is preferably permanently open, while the first oil guide can be closed by means of the valve.

The valve is preferably actuated by a clutch actuator for actuating the friction clutch, wherein the clutch actuator preferably comprises a ball ramp mechanism. The same actuator which defines the state of connection of the transfer gearbox device can therefore also open and close the valve and hence the oil circuit—preferably automatically when the state of connection is changed. It is thus possible to actively control the oil circuit by means of a component which is present in any case.

The differential gear preferably has at least one side wheel. When the valve is closed, the oil in the first oil sump, after reaching a static oil level, preferably reaches at least as far as the lower edge of the side wheel in order to lubricate the differential gear in this operating state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
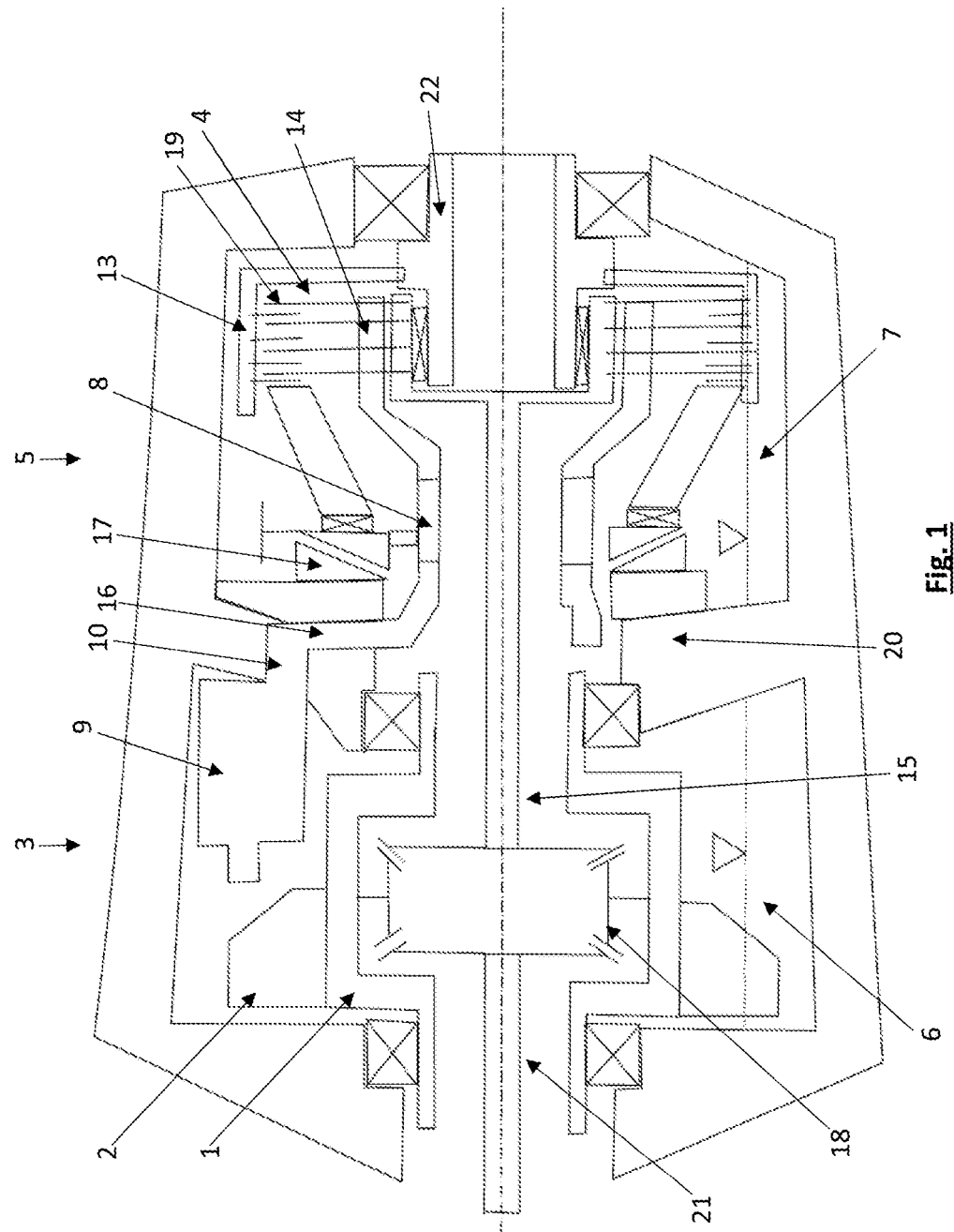
FIG. 1 is a sectional view of a transfer gearbox device according to the invention with the clutch closed and the valve open, showing especially the oil feed (first oil guide).
Figure 2:
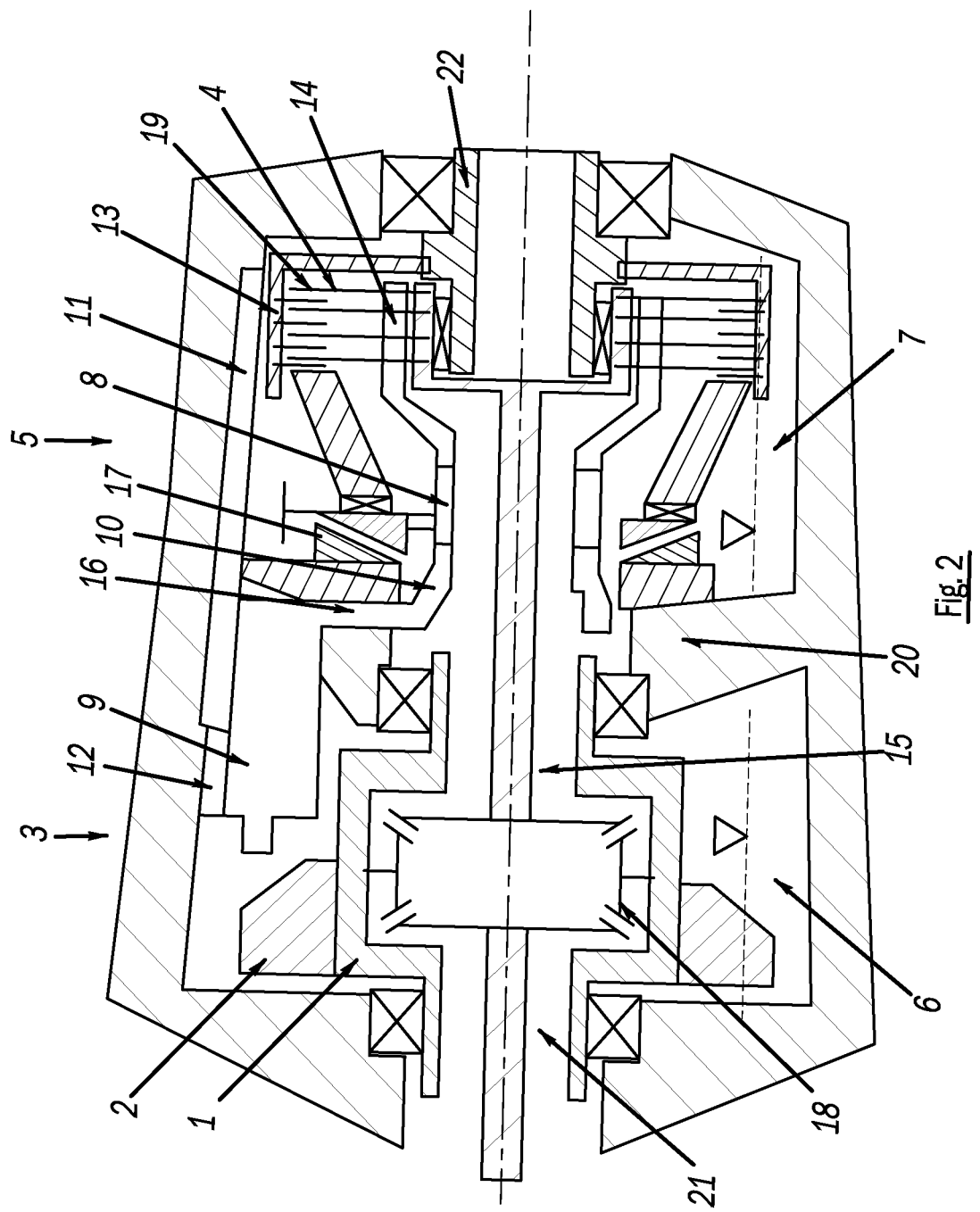
FIG. 2 is a sectional view of a transfer gearbox device according to the invention with the clutch closed and the valve closed, showing especially the oil return (second oil guide) at a first time.
Figure 3:
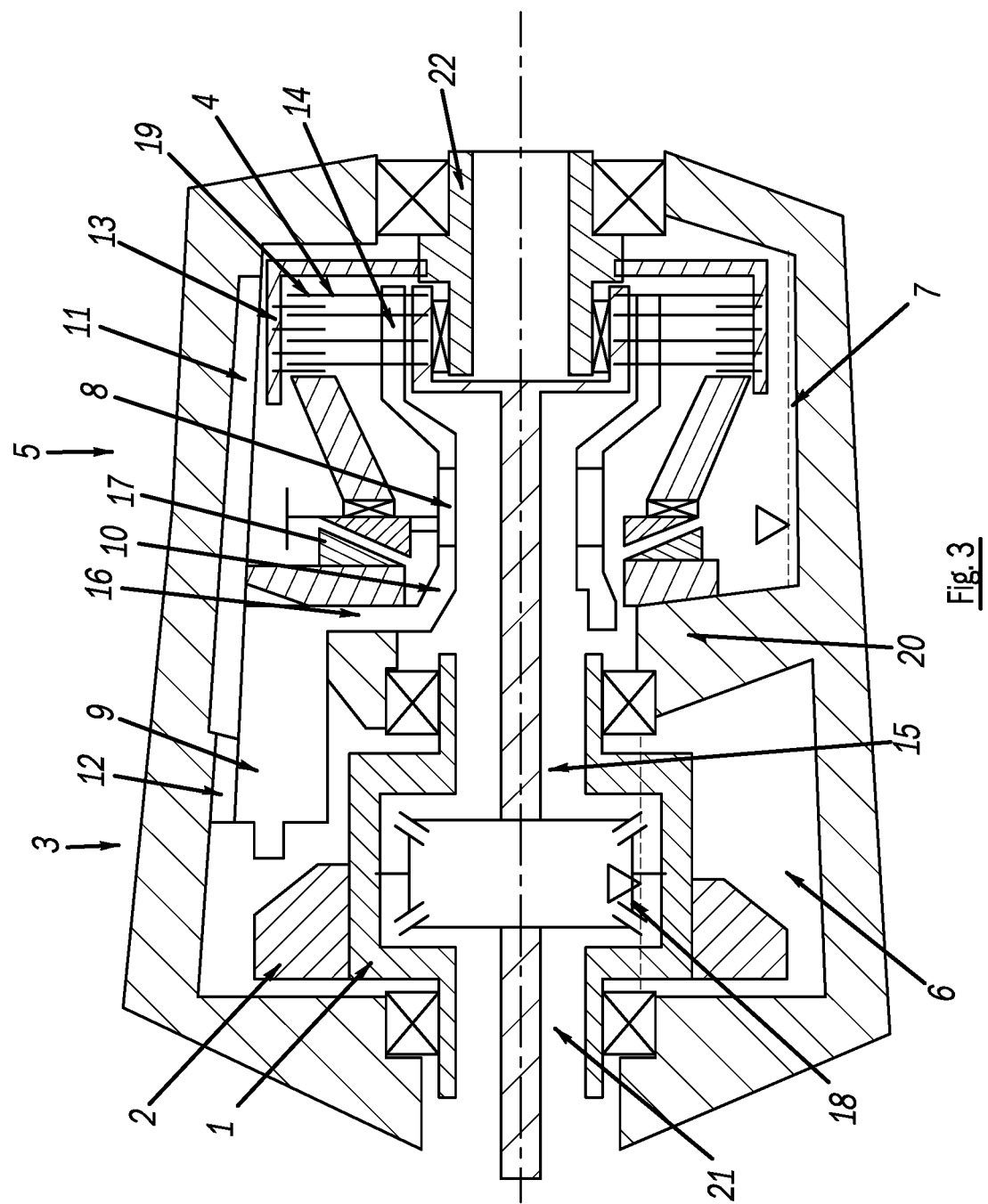
FIG. 3 is a sectional view of a transfer gearbox device according to the invention with the clutch open and the valve closed, showing especially the oil return (second oil guide) at a second time.

A transfer gearbox device according to the invention is illustrated in FIGS. 1-3.

The transfer gearbox device comprises a differential gear 1, having at least one crown wheel 2, as an input element of the differential gear 1, and having a first output shaft 15 and a second output shaft 21 on the two sides of the differential gear 1. The differential gear 1 is arranged in a first oil chamber 3 of the transfer gearbox device, and a friction clutch 4 is arranged in a second oil chamber 5 of the transfer gearbox device. By means of the friction clutch 4, the first output shaft 15 can be coupled to a clutch output shaft 22.

As can be seen in FIG. 1 (oil feed with the clutch 4 closed and the valve 8 open), the first oil chamber 3 comprises a first oil sump 6 and the second oil chamber 5 comprises a second oil sump 7 in the bottom region in the installed position. The oil level in the oil sumps is in each case indicated by a dotted line and a triangle resting by its tip on said line.

Arranged between the first oil chamber 3 and the second oil chamber 5 is a valve 8, and therefore, when the valve 8 is open, oil can pass via the valve 8 out of the first oil chamber 3 into the second oil chamber 5. The first and the second oil chamber 3, 5 are operated with a common oil quantity for the transfer gearbox device. When the valve 8 is closed, oil cannot pass via the valve 8 out of the first oil chamber 3 into the second oil chamber 5.

The valve 8 and the crown wheel 2 are arranged in such a manner that, when the valve 8 is open, upon rotation of the crown wheel 2 oil is conveyed by means of the crown wheel 2 out of the first oil sump 3 into a first oil collector 9 and is guided from the first oil collector 9 via a first oil guide 10, comprising an oil downpipe 16 and an oil finger 14, and via the open valve 8 radially inward to the friction clutch 4 in order to cool and/or to lubricate the friction clutch 4.

As can be seen in FIGS. 2 and 3, a second oil collector 11 and a second oil guide 12 of the transfer gearbox device are arranged in such a manner that, upon rotation of a component of the friction clutch 4, in particular a clutch cage 13 of the friction clutch 4 and/or plates 19 of the friction clutch 4, oil is conveyed by means of the component of the friction clutch 4, i.e. by means of clutch cage 13 and/or plates 19, out of the friction clutch 4 into the second oil collector 11 and is guided from the second oil collector 11 via the second oil guide 12 into the first oil sump 3.

In the connect state (closed clutch, FIGS. 1 and 2), the crown wheel 2 thus rotates and picks up oil from the first oil sump 3 and flings this oil at a high level into the first oil collector 9. The oil subsequently runs in the direction of an intermediate wall 20, which is positioned between the left-hand and the right-hand oil chamber and which therefore separates the first oil chamber 3 (drive assembly oil chamber), illustrated on the left, and the second oil chamber 5 (clutch oil chamber), illustrated on the right.

The intermediate wall 20 also serves as a bearing receptacle of the differential cage of the differential gear 1. Via the oil downpipe 16, the oil reaches the positions of actuation of the ball ramp, i.e. the clutch actuator 17. The valve 8 which can close and open the oil flow between the oil downpipe 16 and the oil finger 14 in a controlled manner is also implemented on this actuating mechanism, clutch actuator 17.

In the connect state (clutch closed, FIGS. 1 and 2), the valve 8 is open in a normal operating state (FIG. 1), with the result that the oil flows onward in the direction of the rotating oil finger 14. The oil is supplied radially on the inside to the clutch pack of the friction clutch 4 and flung off outward.

The oil flung off drips into the second oil sump 7 of the second oil chamber 5 and, once there, is immediately conveyed upward out of an oil pan by the pumping action of the clutch cage 13 and at that location is flung into an oil catching device, namely the second oil collector 11 (see FIG. 2).

From this oil catching device, the second oil collector 11, the oil can then flow back into the first oil chamber 3 (drive assembly oil chamber) with the second oil guide 12 as an oil return. This oil return via the second oil guide 12 can take place even when the valve 8 is closed (see FIG. 2), and this can take place, in particular, immediately before the opening of the friction clutch 4.

In the disconnect state (clutch open, FIG. 3), the valve 8 is closed and the feed to the second oil chamber 5 is thus blocked. The remaining oil present in the second oil chamber 5 is pumped off through the rotating clutch cage 13 by means of oil return to the left.

Thus, the first oil sump 6 in the left-hand, first oil chamber 3 is increased, and the tips of the side wheels 18 of the differential gear 1 dip into the sump in order in this way to ensure adequate lubrication of the differential. The crown wheel 2 can be stationary in this state.

The second oil sump 7 in the right-hand, second oil chamber 5 is reduced to a minimum, and the second oil chamber 5 becomes "virtually dry".

The size of the first oil chamber 3 can also be adapted, in particular the volumetric capacity thereof can be increased, in such a manner that, although the differential gear 1 receives sufficient oil for "torque idling", only slight drag torques are caused.

LIST OF REFERENCE SIGNS

1 differential gear
2 crown wheel
3 first oil chamber
4 friction clutch
5 second oil chamber
6 first oil sump
7 second oil sump
8 valve
9 first oil collector
10 first oil guide
11 second oil collector
12 second oil guide
13 clutch cage
14 oil finger
15 first output shaft
16 oil downpipe
17 clutch actuator
18 side wheel
19 plates
20 intermediate wall
21 second output shaft
22 clutch output shaft

The invention claimed is:

1. A transfer gear device for a motor vehicle, comprising:
   a differential gear with at least one crown wheel in a first oil chamber, and
   a friction clutch in a second oil chamber,
   wherein the first oil chamber comprises a first oil sump and the second oil chamber comprises a second oil sump,
   wherein a valve is arranged between the first oil chamber and the second oil chamber, and therefore, when the valve is open, oil can pass via the valve out of the first oil chamber into the second oil chamber and, when the valve is closed, oil cannot pass via the valve out of the first oil chamber into the second oil chamber,
   wherein the valve and the crown wheel are arranged in such a manner that, when the valve is open, upon rotation of the crown wheel oil is conveyed by means of the crown wheel out of the first oil sump into a first oil collector and is guided from the first oil collector via a first oil guide and via the valve to the friction clutch in order to cool and/or to lubricate the friction clutch.

2. The transfer gear device as claimed in claim 1, wherein a second oil collector and a second oil guide of the transfer gear device are arranged in such a manner that, upon rotation of a component of the friction clutch, in particular a clutch cage of the friction clutch and/or plates of the friction clutch, oil is conveyed by means of the component of the friction clutch out of the friction clutch into the second oil collector and is guided from the second oil collector via the second oil guide into the first oil sump.

3. The transfer gear device as claimed in claim 2, wherein the second oil guide is arranged substantially radially outside the first oil guide.

4. The transfer gear device of claim 2, wherein the device has a clutch connect state and clutch disconnect state, wherein in the clutch connect state, the friction clutch opens the valve and oil is conveyed form the first oil sump to the friction clutch via the first oil guide and oil is conveyed from the second oil sump to the first oil sump via the second oil guide, and wherein in the clutch disconnect state the clutch closes the valve and oil is blocked from being conveyed from the first oil sump to the second oil sump via the first oil guide, and oil can continue to be conveyed from the second oil sump to the first oil sump via the second oil guide.

5. The transfer gear device as claimed in claim 1 wherein the transfer gear device comprises a clutch actuator which is configured to actuate the friction clutch, wherein the clutch actuator opens the valve when the friction clutch is closed, and the clutch actuator closes the valve when the friction clutch is open.

6. The transfer gear device as claimed in claim 1, wherein the first oil guide is designed in such a manner that the oil is supplied to a radially inner portion of the friction clutch and is flung off radially outward to drip into the second oil sump.

7. The transfer gear device as claimed in claim 1, wherein the first oil guide comprises an oil finger, wherein the oil finger is arranged coaxially on a first output shaft of the differential gear and rotates with the first output shaft.

8. The transfer gear device as claimed in claim 1, wherein the first oil guide comprises an oil downpipe, wherein oil is guided out of the first oil collector via the oil downpipe by means of gravity in the direction of the friction clutch.

9. The transfer gear device as claimed in claim 8, wherein oil is guided out of the first oil collector via the oil downpipe by means of gravity to the oil finger, wherein the valve is arranged between the oil downpipe and the oil finger.

10. The transfer gear device as claimed in claim 1, wherein the valve is actuated by a clutch actuator for actuating the friction clutch, wherein the clutch actuator comprises a ball ramp mechanism.

11. The transfer gear device as claimed in claim 1, wherein the differential gear has at least one side wheel, and, when the valve is closed, the oil in the first oil sump, after reaching a static oil level in the first oil sump, reaches at least as far as the lower edge of the side wheel.

12. The transfer gear device as claimed in claim 1, wherein the valve is opened and closed automatically in response to actuation of the friction clutch, and wherein the valve is located above an oil level of the second oil sump when the friction clutch is closed and the valve is open.

13. The transfer gear device as claimed in claim 1, wherein the first oil guide includes a down pipe selectively fluidly connected to an oil finger via the valve, wherein the valve is disposed axially between the downpipe and the oil finger, and the downpipe is disposed axially between the first oil collector and the valve.

14. A transfer gear device for a motor vehicle, comprising:
a differential gear with at least one crown wheel in a first oil chamber, and
a friction clutch in a second oil chamber,
wherein the first oil chamber comprises a first oil sump and the second oil chamber comprises a second oil sump,
a first oil collector disposed in the first oil chamber and a first oil guide extending from the first oil collector in the first oil chamber to the second oil chamber,
a valve connected to the first oil guide;
wherein the valve is arranged between the first oil chamber and the second oil chamber, and therefore, when the valve is open, oil can pass via the valve out of the first oil chamber into the second oil chamber and, when the valve is closed, oil cannot pass via the valve out of the first oil chamber into the second oil chamber,
wherein the valve and the crown wheel are arranged in such a manner that, when the valve is open, upon rotation of the crown wheel oil is conveyed by means of the crown wheel out of the first oil sump into the first oil collector and is guided from the first oil collector via the first oil guide and via the valve to the friction clutch in order to cool and/or to lubricate the friction clutch;
wherein the valve is opened and closed automatically in response to actuation of the friction clutch; and
wherein the valve is located above an oil level of the second oil sump when the friction clutch is closed and the valve is open.

15. A transfer gear device for a motor vehicle, comprising:
a differential gear with at least one crown wheel in a first oil chamber having a first oil sump, and
a friction clutch in a second oil chamber having a second oil sump,
a first oil collector disposed above the first oil sump configured to collect oil that is flung from the crown wheel during rotation of the crown wheel;
a second oil collector disposed above the second oil sump configured to collect oil that is flung from a component of the friction clutch during rotation of the component of the friction clutch;
a first oil guide extending from the first oil collector to the friction clutch;
a second oil guide extending from the second oil collector to the first oil chamber;
a valve disposed in the first oil guide, the valve configured to selectively block oil from being conveyed to the friction clutch via the first oil guide;
wherein, when the friction clutch is closed, oil is conveyed from the first oil sump to the second oil sump via the first oil guide;
wherein, when the friction clutch is open, oil is blocked from being conveyed from the first oil sump to the second oil sump via the first oil guide, and oil from the second oil sump is conveyed to the first oil sump via the second oil guide;
wherein an oil level in the first oil sump is increased;
wherein an oil level in the second oil sump is minimized when the clutch is open and the valve is closed.

16. The transfer gear device of claim 15, wherein the valve is disposed above the oil level in the second oil sump both when the clutch is open and when the clutch is closed.

17. The transfer gear device of claim 15, wherein the first oil guide includes a downpipe disposed in a first axial direction relative to the first oil collector, wherein the valve is axially downstream from the downpipe in the first axial direction, and an oil finger of the first oil guide is axially downstream from the valve in the first axial direction.

* * * * *